United States Patent [19]

Valyocsik

[11] Patent Number: 4,941,963

[45] Date of Patent: Jul. 17, 1990

[54] SYNTHESIS OF CRYSTALLINE ZSM-11 STRUCTURE

[75] Inventor: Ernest W. Valyocsik, Yardley, Pa.

[73] Assignee: Mobil Oil Corp., New York, N.Y.

[21] Appl. No.: 400,412

[22] Filed: Aug. 30, 1989

[51] Int. Cl.[5] .......................... C10G 1/00; C01B 33/28
[52] U.S. Cl. ........................................ 208/46; 423/328
[58] Field of Search ....................... 423/328, 329, 330; 502/77; 208/46, 113, 133, 134, 135–141, 108–112

[56] References Cited

U.S. PATENT DOCUMENTS

| | | | |
|---|---|---|---|
| 3,709,979 | 1/1973 | Chu | 423/328 |
| 4,482,531 | 11/1984 | Ruehl | 423/329 |
| 4,490,342 | 12/1984 | Valyocsik | 423/328 |
| 4,531,012 | 7/1985 | Valyocsik | 564/295 |
| 4,537,751 | 8/1985 | Marcantonio | 423/114 |
| 4,559,213 | 12/1985 | Kühl | 423/329 |
| 4,585,638 | 4/1986 | Kühl | 423/328 |
| 4,585,639 | 4/1986 | Szostak | 423/328 |
| 4,619,820 | 10/1986 | Valyocsik | 423/328 |
| 4,623,527 | 11/1986 | Derouane et al. | 423/306 |
| 4,632,815 | 12/1986 | Valyocsik | 423/328 |
| 4,637,923 | 1/1987 | Szostak | 423/328 |

OTHER PUBLICATIONS

Lok et al., "The Role of Organic Molecules in Molecular Sieves", 3 Zeolites, 282-291 (1983).

*Primary Examiner*—Robert L. Stoll
*Assistant Examiner*—R. Bruce Breneman
*Attorney, Agent, or Firm*—Alexander J. McKillop; Charles J. Speciale; Dennis P. Santini

[57] ABSTRACT

This invention relates to a new form of crystalline material identified as ZSM-11, to a new and useful improvement in synthesizing said crystalline material and to use of said crystalline material prepared in accordance herewith as a catalyst for organic compound, e.g. hydrocarbon compound, conversion.

20 Claims, No Drawings

SYNTHESIS OF CRYSTALLINE ZSM-11 STRUCTURE

BACKGROUND OF THE INVENTION

1. Field of the Invention

This invention relates to a new and useful improvement in synthesizing the crystalline ZSM-11 structure, the new ZSM-11 synthesized, and to use of the crystalline material synthesized in accordance herewith as a catalyst component for organic compound, e.g. hydrocarbon compound, conversion.

More particularly, this invention relates to an improved method for preparing the crystalline ZSM-11 structure whereby synthesis is facilitated and reproducible and the product exhibits high purity and catalytic utility.

2. Discussion of the Prior Art

ZSM-11 and its conventional preparation are taught by U.S. Pat. No. 3,709,979, the entire disclosure of which is incorporated herein by reference. The templates taught to direct synthesis of ZSM-11 in U.S. Pat. No. 3,709,979 are $C_1$–$C_7$ quaternary compounds of, for example, nitrogen or phosphorus, e.g. benzyltrimethylphosphonium, tetrabutylammonium or tetrabutylphosphonium compounds. Synthesis of ZSM-11 is taught in U.S. Pat. No. 4,108,881 with $C_7$–$C_{12}$ alkylenediamines as directing agents.

Lok et al. (3 Zeolites, 282–291 (1983)) teach numerous organic compounds which act as directing agents for synthesis of various crystalline materials, such as, for example, ZSM-5, ZSM-11, ZSM-12, ZSM-20, ZSM-35, ZSM-48, $AlPO_4$-5, $AlPO_4$-8, $AlPO_4$-20 and others. The article does not show any diquaternary ammonium directed synthesis of ZSM-11.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of another novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-$C_{4-10}$-diquat directing agent for synthesis of ZSM-12; U.S. Pat. No. 4,482,531, teaching synthesis of ZSM-12 with a DABCO-$C_n$-diquat, n being 4, 5, 6 or 10, directing agent; and U.S. Pat. No. 4,539,193, teaching use of bis (dimethylpiperidinium) trimethylene directing agent for synthesis of ZSM-12.

U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of trimethylamine, triethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonimum hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a particular assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4\,or\,6}N^+(CH_3)_2(C_2H_5)$ as directing agent for synthesis of ZSM-12. Synthesis of ZSM-5 is directed by the diquaternary $(alkyl)_3N^+(CH_2)_6N^+(alkyl)_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 have the same structure.

Applicant knows of no prior art for preparing the crystalline ZSM-11 structure utilizing as a directing agent the novel diquaternary ammonium required of the present invention.

SUMMARY OF THE INVENTION

An improved, economical and reproducible method for preparing a crystalline structure identified as ZSM-11 exhibiting high purity, catalytic activity and other valuable properties is provided. The method comprises forming a reaction mixture hydrogel containing sources of alkali or alkaline earth metal (M) cations; an oxide of trivalent element X, e.g. aluminum, boron, iron, gallium, indium and mixtures thereof; an oxide of tetravalent element Y, e.g. silicon, germanium, tin and mixtures thereof; an organic directing agent R, hereinafter more particularly described; and water, said reaction mixture having a composition in terms of mole ratios, within the following ranges:

| Reactants | Useful | Preferred |
|---|---|---|
| $YO_2/X_2O_3$ | at least 20 | 50 to 20,000 |
| $H_2O/YO_2$ | 5 to 200 | 10 to 100 |
| $OH^-/YO_2$ | 0.01 to 2.0 | 0.1 to 0.5 |
| $M/YO_2$ | 0.01 to 3.0 | 0.1 to 1.0 |
| $R/YO_2$ | 0.02 to 2.0 | 0.05 to 0.5 |

The method further comprises maintaining the reaction mixture until crystals of ZSM-11 structure are formed. Reaction conditions required consist of heating the foregoing reaction mixture to a temperature of from about 60° C. to about 250° C. for a period of time of from about 24 hours to about 30 days. A more preferred temperature range is from about 100° C. to about 200° C. with the amount of time at a temperature in such range being from about 24 hours to about 6 days. The solid product comprising ZSM-11 crystals is recovered from the reaction medium, as by cooling the whole to room temperature, filtering and water washing.

EMBODIMENTS

The particular effectiveness of the presently required novel directing agent, hereafter more particularly described, when compared with other directing agents, such as those identified above, is believed due to its ability to function as a template in the nucleation and growth of ZSM-11 crystals. This is true even though no predigestion of the gel is required prior to crystallization. This different organic directing agent functions in this fashion in a reaction mixture having the above described composition.

It should be noted that the ratios of components of the reaction mixture required herein are critical to achieve maximum effectiveness. For instance, when the $R/YO_2$ ratio is low, e.g. less than about 0.1, the $YO_2/X_2O_3$ ratio must be high, e.g. greater than about 60, for crystallization to proceed in a timely, efficient manner.

The synthesis of the present invention is facilitated when the reaction mixture comprises seed crystals, such as those having the structure of ZSM-11. The use of at least 0.01%, preferably about 0.10%, and even more preferably about 1% seed crystals (based on total weight) of crystalline material will be useful.

The reaction mixture composition for the synthesis of synthetic crystalline ZSM-11 hereby can be prepared utilizing materials which can supply the appropriate oxide. The useful sources of $X_2O_3$, e.g. aluminum oxide, include, as non-limiting examples, any known form of such oxide, e.g. aluminum oxide or hydroxide, organic or inorganic salt or compound, e.g. alumina and aluminates. The useful sources of $YO_2$, e.g. silicon oxide, include, as non-limiting examples, known forms of such oxide, e.g. silicic acid or silicon dioxide, alkoxy- or other compounds of silicon, including silica gel and silica hydrosol. Colloidal silica sol and silica gel (e.g. "SPEX") are better sources of silica than Q-brand sodium silicate for the present synthesis.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising ZSM-11 crystals will vary with the exact nature of the reaction mixture employed within the above limitations.

The novel organic diquaternary ammonium directing agent required of the present method is provided by a Bis (butylpyrrolidinium)-DIQUAT-n compound, where n is 6 or 7, such as, for example, the hydroxide or halide (e.g. chloride, bromide or iodide). This compound may be structurally represented as follows:

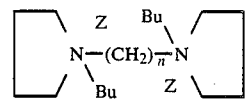

where Z is an anion, e.g. hydroxide, Bu is -butyl and n is 6 or 7. The cation of this compound may be represented by the formula:

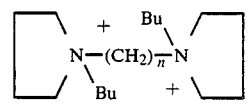

This directing agent has been found to effectively stabilize the developing crystal framework of ZSM-11 during hydrothermal synthesis. It also leads to a ZSM-11 crystal framework capable of an extremely wide range of $YO_2/X_2O_3$ mole ratios as shown herein.

The ZSM-11 composition as prepared hereby has a characteristic X-ray diffraction pattern, including values substantially as set forth in Table 1, hereinafter.

TABLE 1

| Interplanar d-Spacing, (A) | Relative Intensity ($I/I_o$) |
|---|---|
| 11.2 ± .2 | m |
| 10.1 ± .2 | m |
| 6.73 ± .2 | w |
| 5.75 ± .1 | w |
| 5.61 ± .1 | w |
| 5.03 ± .1 | w |
| 4.62 ± .1 | w |
| 4.39 ± .08 | w |
| 3.86 ± .07 | vs |
| 3.86 ± .07 | m |
| 3.49 ± .07 | w |
| (3.07, 3.00 ± .05) | w |
| 2.01 ± .02 | w |

The parenthesis around lines 3.07 and 3.00 indicate that they are separate and distinct lines, but are often superimposed.

These X-ray diffraction data are collected with a Rigaku diffraction system, equipped with a graphite diffracted beam monochromator and scintillation counter, using copper K-alpha radiation. The diffraction data are recorded by step-scanning at 0.02 degrees of two-theta, where theta is the Bragg angle, and a counting time of 1 second for each step. The interplanar spacings, d's, are calculated in Angstrom units (A), and the relative intensities of the lines, $I/I_o$, where $I_o$ is one-hundredth of the intensity of the strongest line, above background, are derived with the use of a profile fitting routine (or second derivative algorithm). The intensities are uncorrected for Lorentz and polarization effects. The relative intensities are given in terms of the symbols vs=very strong (75–100), s=strong (50–74), m=medium (25–49) and w=weak (0–24). It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline material of ZSM-11 structure prepared hereby has a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is at least about 10, usually from about 20 to about 10,000, more usually from about 40 to about 2,000. In the as-synthesized form, the material has a formula, on an anhydrous basis and in terms of moles of oxides per y moles of $YO_2$, as follows:

$$(0.01-20)M_2O(0.01-10)R_2O:X_2O_3:yYO_2$$

wherein M and R are as defined above. The M and R components are associated with the material as a result of their presence during crystallization, and are easily removed by post-crystallization methods hereinafter more particularly described.

Synthetic ZSM-11 prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the ZSM-11 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic ZSM-11, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized ZSM-11 can be prepared by heating same at a temperature of from about 200° C. to about 550° C. for from 1 hour to about 48 hours.

The original cations, e.g. alkali or alkaline earth metal, of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB and VIII of the Periodic Table of the Elements, especially gallium, indium and tin.

Typical ion exchange technique would be to contact the synthetic ZSM-11 with a salt of the desired replacing cation or cations. Examples of such salts include the halides, e.g. chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the ZSM-11 is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline ZSM-11 prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the ZSM-11 hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjuction with the ZSM-11, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized ZSM-11 include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the ZSM-11 crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

While the improved crystalline material of the present invention may be used in a wide variety of organic compound, e.g. hydrocarbon compound, conversion reactions, it is notably useful in the shape-selective processes of catalytic cracking, conversion of methanol to gasoline or olefins, isomerization of xylenes and disproportionation of toluene. Other conversion processes for which improved ZSM-11 may be utilized in one or more of its active forms include, for example, paraffin aromatization, naphtha reforming and paraffinic gas oil dewaxing. In general, organic compounds such as, for example, those selected from the group consisting of hydrocarbons, alcohols and ethers, are converted to conversion products such as, for example, aromatics and lower molecular weight hydrocarbons, over the catalyst composition described above by contact under organic compound conversion conditions. Such conditions may include a temperature of from about 100° C. to about 800° C., a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic, e.g. hydrocarbon, compound mole ratio of from 0 (no added hydrogen) to about 100.

More specifically, when such conversion process includes cracking hydrocarbons, the reaction conditions include a temperature of from about 300° C. to about 700° C., a pressure of from about 0.1 atmosphere (bar) to about 30 atmospheres and a weight hourly space velocity of from about 0.1 to about 20. When the process involves converting paraffins to aromatics, the reaction conditions include a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from 0 to about 20. When converting alcohols, e.g. methanol, or ethers, e.g. dimethylether, or mixtures thereof, to hydrocarbons including aromatics, the reaction conditions include a temperature of from about 275° C. to about 600° C., a pressure of from about 0.5 atmosphere to about 50 atmospheres and a liquid hourly space velocity of from about 0.5 to about 100. Isomerizing xylene feedstock components over the present catalyst will require reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; and disproportionating toluene will require reaction conditions including a temperature of from about 200° C. to about 760° C., a pressure of from about atmospheric to about 60 atmospheres and a weight hourly space velocity of from about 0.08 to about 20.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of absorbate vapor controlled by a manostat during the adsorption period, which did not exceed about 8 hours. As adsorbate was adsorbed by the sorbant material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLES 1-13

Table 2 presents details of ten specific examples of the present synthesis and three comparative examples. In Examples 1-7, 9, 10, 12 and 13 Bis(butylpyrrolidinium)-DIQUAT-n was used as directing agent, with n being 6 in Examples 1, 3-5, 7, 9, 10, 12 and 13, and n being 7 in Examples 2 and 6. Examples 8 and 11 used Bis (butylpyrrolidinium)-DIQUAT-n, with n being 5 and 4, respectively.

Other reactants were utilized in appropriate quantities to provide the reaction mixture ratios shown. Silica sol (30% SiO$_2$) and NaAlO$_2$ were used in Examples 1-3, 4 and 5. Silica gel from SPEX Industries and In(-NO$_3$)$_3$·xH$_2$O were used in Example 4. Silica sol (30% SiO$_2$), Al$_2$(SO$_4$)$_3$·18 H$_2$O and KOH were used in Examples 7 and 13. Q-brand sodium silicate and Al$_2$(SO$_4$)$_3$·18 H$_2$O were used in Examples 8 and 12. The SPEX silica gel and SnSO$_4$ were used in Examples 9 and 10.

For comparative purposes, the crystallizations were conducted at 160° C. in a stirred reactor over the time indicated in Table 2.

The products of Examples 1-7, 9, 10 and 13 were 100% crystalline ZSM-11 in accordance with the present invention.

The product of Example 5, using the DIQUAT with n being 5, did not contain ZSM-11. It was a mixture composed of mordenite and alpha-quartz.

The product of Example 11, using the DIQUAT with n being 4, and Q-brand sodium silicate did not contain ZSM-11. It was a mixture composed of mordenite, alpha-quartz and an unidentified material.

The product of Example 12, using the proper DIQUAT, e.g. n=6, but having a $YO_2/X_2O_3$ ratio of 60 along with an $R/YO_2$ ratio of only 0.09 was amorphous when stopped at 3 days.

X-ray diffraction patterns for the product of Example 1 included the values shown in Table 3. Chemical analysis of products listed in Table 2 are shown in Table 4.

TABLE 3-continued

| Interplanar d-Spacings (A) | Observed 2 × Theta | Relative Intensities (I/I$_o$) |
|---|---|---|
| 1.9967 | 45.421 | 6.7 |

*ZSM-5 impurity peak (may be present as intergrowth).

TABLE 4

| | Product Chemical Analysis | | | |
|---|---|---|---|---|
| | Moles C | Moles per Mole X or Y | Element | |
| Example | Moles N | $N_2O:M_2O:SiO_2$ | X | Y |
| 1 | 11.4 | 13.2:8.58:571 | Al | — |
| 2 | 12.2 | 10.1:7.39:476 | Al | — |
| 3 | 11.8 | 1.5:0.87:62.9 | Al | — |
| 4 | 11.1 | 1.9:2.05:93.1 | In | — |
| 5 | 11.6 | 0.90:0.54:30.9 | Al | — |
| 6 | 12.2 | 0.84:0.38:34.7 | Al | — |
| 7 | 14.6 | 0.58:0.22:34.4 | Al | — |
| 9 | 12.0 | 1.3:0.69:61.0 | — | Sn |
| 10 | 11.9 | 1.1:0.89:54.6 | — | Sn |
| 13 | 12.2 | 0.50:0.20:25.8 | Al | — |

TABLE 2

| | | Reaction Mixture Compositions (Mole Ratios) | | | | | | | Run | |
| Example | n | $SiO_2/Al_2O_3$ | $SiO_2/Sn$ | $SiO_2/In_2O_3$ | $H_2O/SiO_2$ | $OH^-/SiO_2$ | $Na^+/SiO_2$ | $R/SiO_2$ | Time, Days | Product |
|---|---|---|---|---|---|---|---|---|---|---|
| 1 | 6 | ∞ | — | — | 40 | 0.30 | 0.30 | 0.10 | 6 | ZSM-11 |
| 2 | 7 | ∞ | — | — | 40 | 0.30 | 0.30 | 0.10 | 5 | ZSM-11 |
| 3 | 6 | 200 | — | — | 40 | 0.30 | 0.31 | 0.07 | 4 | ZSM-11 |
| 4 | 6 | — | — | 200 | 40 | 0.30 | 0.34 | 0.07 | 3 | ZSM-11 |
| 5 | 6 | 90 | — | — | 40 | 0.30 | 0.32 | 0.10 | 6 | ZSM-11 |
| 6 | 7 | 90 | — | — | 40 | 0.30 | 0.30 | 0.10 | 5 | ZSM-11 |
| 7 | 6 | 90 | — | — | 40 | 0.30 | 0.39 | 0.10 | 4 | ZSM-11 |
| 8 | 5 | 90 | — | — | 40 | 0.30 | 0.59 | 0.08 | 4 | Mordenite + α-quartz |
| 9 | 6 | — | 75 | — | 40 | 0.30 | 0.35 | 0.07 | 3 | ZSM-11 |
| 10 | 6 | — | 70 | — | 40 | 0.40 | 0.34 | 0.07 | 4 | ZSM-11 |
| 11 | 4 | 60 | — | — | 40 | 0.30 | 0.59 | 0.08 | 4 | Mordenite + α-quartz + unidentified |
| 12 | 6 | 60 | — | — | 40 | 0.30 | 0.59 | 0.09 | 3 | Amorphous |
| 13 | 6 | 60 | — | — | 40 | 0.30 | 0.43 | 0.10 | 4 | ZSM-11 |

TABLE 3

| Interplanar d-Spacings (A) | Observed 2 × Theta | Relative Intensities (I/I$_o$) |
|---|---|---|
| 11.112 | 7.956 | 48.5 |
| 9.987 | 8.854 | 35.2 |
| 7.422 | 11.924 | 7.7 |
| 7.058 | 12.542 | 3.0 |
| 6.723 | 13.169 | 2.2 |
| 6.354 | 13.938 | 1.7* |
| 6.036 | 14.675 | 4.4 |
| 5.955 | 14.875 | 7.6 |
| 5.548 | 15.973 | 4.3 |
| 5.120 | 17.321 | 2.4 |
| 4.987 | 17.784 | 3.7 |
| 4.587 | 19.350 | 5.7 |
| 4.456 | 19.926 | 1.6 |
| 4.364 | 20.347 | 8.3 |
| 4.261 | 22.847 | 1.4* |
| 3.989 | 22.284 | 0.9 |
| 3.826 | 23.250 | 100.0 |
| 3.714 | 23.961 | 34.2 |
| 3.477 | 25.617 | 2.3 |
| 3.382 | 26.356 | 1.5 |
| 3.323 | 26.826 | 4.5 |
| 3.044 | 29.341 | 5.3 |
| 2.9765 | 30.021 | 7.7 |
| 2.8576 | 31.301 | 1.1 |
| 2.7843 | 32.147 | 0.6 |
| 2.7264 | 32.849 | 0.4 |
| 2.6541 | 33.770 | 0.4 |
| 2.5996 | 34.500 | 2.2 |
| 2.5482 | 35.218 | 1.1 |
| 2.5032 | 35.873 | 1.1 |
| 2.4858 | 36.133 | 2.7 |
| 2.4025 | 37.431 | 1.1 |
| 2.3917 | 37.607 | 0.5 |
| 2.1064 | 42.936 | 0.5 |
| 2.0697 | 43.735 | 0.6 |
| 2.0032 | 45.265 | 2.1 |

EXAMPLE 14

Scanning electron photomicrographs were obtained for the product crystals of Examples 1 and 5, proving the products uniformly to be aggregates of very small crystals of less than 0.2 μm. Example 1 was conducted with a reaction mixture $YO_2/X_2O_3$, i.e. $SiO_2/Al_2O_3$, mole ratio of essentially "infinity", with such ratio only 90 for Example 5.

EXAMPLE 15

The calcined hydrogen form of the crystalline product of Example 3 was evaluated for sorption capacities for water, cyclohexane and n-hexane vapor at 25° C. The capacities proved to be 9 wt. % for n-hexane and 5.7 wt. % for cyclohexane (both at 20 mm Hg), and 3.1 wt. % for water (at 12 mm Hg).

EXAMPLE 16

Calcined hydrogen forms of the crystalline products from Examples 1, 3, 5, 7 and 13 were evaluated in the Alpha Test at 538° C. The results were as follows:

| Example # | Alpha Value |
|---|---|
| 1 | 2.9 |
| 3 | 32 |
| 5 | 107 |
| 7 | 200 |

-continued

| Example # | Alpha Value |
|---|---|
| 13 | 280 |

What is claimed is:

1. A method for synthesizing a crystalline material exhibiting a characteristic X-ray diffraction pattern including values as shown in Table 1

TABLE 1

| Interplanar d-Spacing, (A) | Relative Intensity ($I/I_o$) |
|---|---|
| 11.2 ± .2 | m |
| 10.1 ± .2 | m |
| 6.73 ± .2 | w |
| 5.75 ± .1 | w |
| 5.61 ± .1 | w |
| 5.03 ± .1 | w |
| 4.62 ± .1 | w |
| 4.39 ± .08 | w |
| 3.86 ± .07 | vs |
| 3.86 ± .07 | m |
| 3.49 ± .07 | w |
| (3.07, 3.00 ± .05) | w |
| 2.01 ± .02 | w | where vs=very strong (75-100), m=medium (25-49), and w=weak (0-24), which comprises (i) preparing a mixture capable of forming said material, said mixture comprising sources of alkali or alkaline earth metal (M), an oxide of trivalent element (X), an oxide of tetravalent element (Y), water and a directing agent (R), and having a composition, in terms of mole ratios, within the following ranges:

| | |
|---|---|
| $YO_2/X_2O_3$ | at least 20 |
| $H_2O/YO_2$ | 5 to 200 |
| $OH^-/YO_2$ | 0.01 to 2.0 |
| $M/YO_2$ | 0.01 to 3.0 |
| $R/YO_2$ | 0.02 to 2.0 | wherein R is a diquaternary ammonium of the formula:

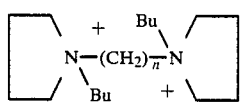

and wherein Bu is -butyl and n is 6 or 7; (ii) maintaining said mixture under sufficient conditions until crystals of said material are formed; and (iii) recovering said crystalline material from step (ii), said recovered crystalline material containing said R.

2. The method of claim 1 wherein said mixture has the following composition ranges:

| | |
|---|---|
| $YO_2/X_2O_3$ | 50 to 20,000 |
| $H_2O/YO_2$ | 10 to 100 |
| $OH^-/YO_2$ | 0.1 to 0.5 |
| $M/YO_2$ | 0.1 to 1.0 |
| $R/YO_2$ | 0.05 to 0.5 |

3. The method of claim 1 wherein said source of directing agent R is the hydroxide or halide.

4. The method of claim 2 wherein said source of directing agent R is the hydroxide or halide.

5. The method of claim 1 wherein said mixture further comprises seed crystals in sufficient amount to enhance synthesis of said crystalline material.

6. The method of claim 5 wherein said seed crystals have the structure of ZSM-11.

7. The method of claim 1 wherein said X is aluminum, boron, iron, gallium, indium or a mixture thereof, and said Y is silicon, germanium, tin or a mixture thereof.

8. The method of claim 1 wherein X comprises aluminum and Y comprises silicon.

9. A mixture capable of forming crystals of ZSM-11 structure upon crystallization, said mixture comprising sources of alkali or alkaline earth metal (M), trivalent element (X) oxide selected from the group consisting of oxide of aluminum, boron, iron, gallium, indium and mixtures thereof; tetravalent element (Y) oxide selected from the group consisting of oxide of silicon, germanium, tin and mixtures thereof; water and diquaternary ammonium (R) of the formula:

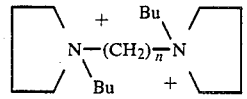

and having a composition, in terms of mole ratios, within the following ranges:

| | |
|---|---|
| $YO_2/X_2O_3$ | at least 20 |
| $H_2O/YO_2$ | 5 to 200 |
| $OH^-/YO_2$ | 0.01 to 2.0 |
| $M/YO_2$ | 0.01 to 3.0 |
| $R/YO_2$ | 0.02 to 2.0 |

10. The method of claim 1 comprising replacing cations of the crystalline material recovered in step (iii), at least in part, by ion exchange with a cation or a mixture of cations selected from the group consisting of hydrogen and hydrogen precursors, rare earth metals and metals from Groups IIA, IIIA, IVA, IB, IIB, IIIB, IVB, VIB and VIII of the Periodic Table of Elements.

11. The method of claim 2 comprising replacing cations of the crystalline material recovered in step (iii), at least in part, by ion exchange with a cation or a mixture of cations selected from the group consisting of hydrogen and hydrogen precursors, rare earth metals and metals from Groups, IIA, IIIA, IVA, IB, IIB, IIIB, IVB, VIB and VIII of the Periodic Table of Elements.

12. The method of claim 10 wherein said replacing cation is hydrogen or a hydrogen precursor.

13. The method of claim 11 wherein said replacing cation is hydrogen or a hydrogen precursor.

14. The recovered crystalline material of claim 1.

15. The recovered crystalline material of claim 2.

16. The diquaternary ammonium R-containing product crystalline material of claim 10.

17. The diquaternary ammonium R-containing product crystalline material of claim 11.

18. The diquaternary ammonium R-containing product crystalline material of claim 12.

19. The diquaternary ammonium R-containing product crystalline material of claim 13.

20. A process for effecting catalytic conversion of an organic compound-containing feedstock which comprises contacting said feedstock under catalytic conversion conditions with a catalyst comprising an active form of the crystalline material product of claim 1.

* * * * *